Patented July 25, 1950

2,516,683

UNITED STATES PATENT OFFICE 2,516,683

LOW TEMPERATURE POLYMERIZATION CATALYST AND PROCESS OF USING SAME

Ralph W. Dornte, Westfield, and John F. McKay, Jr., Elizabeth, N. J., assignors to Standard Oil Development Company, a corporation of Delaware No Drawing. Application July 27, 1945, Serial No. 607,504

11 Claims. (Cl. 260—85.3)

This invention relates to low temperature polymerization processes; relates particularly to the low temperature interpolymerization of isobutylene with a multi-olefin; and relates especially to copolymerization by the use of a stable composition of a Friedel-Crafts catalyst and a multi-olefin in solution.

It has been found possible to copolymerize isobutylene with a multi-olefin such as butadiene, isoprene, dimethyl butadiene, dimethallyl, myrcene, and the like, by mixing together a major proportion of the isobutylene and a minor proportion of the multi-olefin and polymerizing the mixture at temperatures ranging from −40° C. down to −164° C. by the application thereto of a Friedel-Crafts catalyst in solution in a low-freezing, non-complex-forming solvent such as aluminum chloride dissolved in ethyl or methyl chloride, or the like. The polymerization reaction is, however, difficult and, in some ways, unsatisfactory because of the tendencies towards irregular polymerization, after-polymerization, delayed polymerization action, and similar difficulties.

According to the present invention, it is found that, contrary to previous observations, it is possible, by keeping the catalyst concentration in the solution below a critical value, and the temperature below a critical value; to produce a stable mixture of the catalyst and the multi-olefin which can be kept for relatively long periods of time, from many hours to several days without polymerization of the multi-olefin, or deterioration of the catalyst, yet which, when added to cold isobutylene, produces an extremely rapid copolymerization of the isobutylene and the multi-olfin which begins with a minor, or no perceptible time delay, which greatly reduces irregularity and non-proportionality of copolymerization, avoids after polymerization, and, in many ways, contributes to smoothness and efficiency of polymerization; including such advantageous characteristics as a better slurry, a higher percentage yield without production of a slurry which is too viscous to flow, and so forth.

It has been found, as shown in United States Patent No. 2,273,158, that while the polymerization of isobutylene proceeds with considerable speed upon the addition of the polymerization catalyst, there is a time delay or an induction period in the polymerization of butadiene alone after the addition of a polymerization catalyst at low temperature, and attempts have been made to use this time delay to permit of the preliminary mixing of catalyst and butadiene and then the addition of the mixture to the isobutylene for an instantaneous reaction. This procedure, however, is commercially unfeasible since the maximum length of the induction period is a small number of minutes, always less than 5, and usually less than 1 or 2. This induction period is too short for any commercial use because of the fact that the necessary handling of bulk solutions takes much more time than this.

It has been considered that the minimum concentration of aluminum chloride catalyst in alkyl halide solution is higher than 0.3 or 0.4%, the usual catalyst strength being on the order of 0.6 to 1.2%, both of these values being above the critical maximum for the production of stable mixtures of catalyst solution and diolefin. Furthermore, it may be noted, it is found that although an induction period is manifest, the induction period is destroyed by high turbulence, and accordingly, an ordinary catalyst solution containing the diolefin cannot be sprayed through an orifice, because of the fact that the high turbulence in the orifice precipitates a powdery, yellow solid which plugs the spray orifice almost immediately, preventing the delivery of any significant amount of catalyst solution containing the diolefin through the spray head. In contrast, the stable solution of the present invention shows no tendency to precipitate during handling or storage, does not precipitate in the spray nozzles, does not precipitate in storage tanks or transfer tubes or other equipment; and, in addition, shows the interesting property of being a much more powerful, potent catalyst, of much more rapid action.

It has been considered in the past that the aluminum chloride catalyst in solution in ethyl or methyl chloride yielded an instantaneous reaction upon addition to cold isobutylene. This, however, is not strictly so, since a definite concentration of catalyst must be built up in the liquid before the reaction begins, and even after the minimum concentration of catalyst is exceeded, there is a brief time delay on the order of a fraction of a second, sufficiently long to permit of the stirring into an isobutylene mixture of the catalyst by a powerful stirrer, before the reaction proceeds. With the present catalyst, the minimum concentration is either nonexistent or very much lower in magnitude since the polymerization appears to begin without any perceptible delay upon the addition of the catalyst diolefin mixture regardless of the relative bulk of the cold isobutylene and catalyst solution. Also, when the simple aluminum chloride solution catalyst is stirred rapidly into a large bulk of solution, the stirring is sufficiently complete so that the polymerization occurs throughout the bulk of the solution. In comparison with the present catalyst, when the catalyst is injected into the powerfully stirred body of isobutylene, the copolymer is thrown down very close to the point of delivery rather than throughout the bulk of cold liquid, and the estimate of distance of travel and speed of travel indicates that the copolymerization is complete in a time much less than 1/10 of a second, probably less than 1/100 of a second, thereby being different in order of magnitude from prior catalysts.

That is, the bulk effect with prior catalysts has necessitated the use of catalyst of at least 0.6% concentration, since otherwise the bulk of solvent required to carry the catalyst solute into the cold isobutylene was so great as to sharply reduce the catalyst potency. In contrast, catalyst solutions, according to the present invention as low as 0.05%, never above 0.10%, are found to be considerably more powerfully and effective and, in addition, the overall catalyst efficiency, that is, grams of polymer obtained per gram of solid catalyst, is much higher ranging from 5 to 20 times the yield.

Thus the invention produces a composition of matter comprising a mixture of a Friedel-Crafts type catalyst in solution in a low-freezing, non-complex-forming solvent; with a substantial proportion of a multi-olefin, which mixture is stable; and is highly efficient for the copolymerization of the multi-olefin with an isoolefin such as isobutylene or the copolymerization of isobutylene and styrene, and the like. Other objects and details of the invention will be apparent from the following description:

In practicing the invention, there is first prepared a solution of a Friedel-Crafts catalyst in a low-freezing, non-complex-forming solvent at a concentration below a critical value; the critical value with most of the Friedel-Crafts catalysts being in the neighborhood of 0.1%. This catalyst solution is then cooled below a critical temperature; which temperature for most catalyst solutions appears to be in the general neighborhood of −50° C., being below −23° C. and above −100° C.; and a substantial quantity of the multi-olefinic monomer is added to the cold catalyst solution, which mixture is then added to cold isobutylene to copolymerize the multi-olefin with the isobutylene.

It is found that by observing these critical values, the composition of catalyst and multi-olefin may be prepared at any convenient time, and stored for any convenient length of time up to a substantial number of days, without harm to the catalyst or to the multi-olefin, and in fact a significant gain in quality of the copolymer resulting is obtained by a substantial amount of aging of the catalyst-multi-olefin mixture.

For the Friedel-Crafts catalyst, any of the catalysts shown by N. O. Calloway in his article on "The Friedel-Crafts Synthesis" printed in the issue of "Chemical Reviews," published for the American Chemical Society at Baltimore, in 1935, in volume XVII, No. 3, the article beginning on page 327, the list being particularly well shown on page 375, may be used, and are more or less effective, operating with varying degrees of satisfaction.

The Friedel-Crafts catalyst is preferably dissolved in a low-freezing, non-complex-forming solvent by which there is meant a solvent which will dissolve an adequate amount of the Friedel-Crafts catalyst; at least 0.1%, which has a freezing point substantially below 0° C.; although not necessarily as low as the polymerization temperature; which, in addition, can be volatilized away from the Friedel-Crafts catalyst with no more than a nominal rise in temperature of one or two degrees over the boiling point of the pure solvent, thereby being non-complex-forming. Representative catalyst solvents are alkyl chlorides of 1 to 2 carbon atoms such as ethyl or methyl chloride, or substances such as ethylene dichloride, chloroform, carbon disulfide, and the like, and with some of the catalysts, the lower freezing hydrocarbons such as liquid ethane, liquid propane, liquid butane, liquid pentane, and the like.

The catalyst solution is prepared by dissolving the Friedel-Crafts catalyst in the low-freezing, non-complex-forming solvent in a concentration less than the critical value. With aluminum chloride in ethyl or methyl chloride, this critical value is approximately 0.1%, or substantially below 0.2%. With other catalysts the critical value varies somewhat, but as far as present information shows, it is always below 0.3%. Convenient catalyst concentrations lie between 0.1% and 0.01%, amounts less than 0.01% being undesirable, because of the relatively high dilution. The catalyst solution is preferably prepared at a temperature as high as convenient, usually relatively near to the boiling point of the solvent which, with methyl chloride, is −23° C. and with ethyl chloride, is +12° C. The catalyst solution is then cooled to a temperature well below −23° C. This is conveniently obtained by cooling the catalyst solution with solid carbon dioxide either by direct admixture or by the use of a refrigerating jacket containing solid carbon dioxide with ethyl alcohol or propyl alcohol or other convenient heat transfer medium, as desired. Simultaneously, an appropriate quantity of the diolefin which is preferably isoprene or piperylene, or dimethyl butadiene, but may also be butadiene, or any of the multi-olefins having from 4 to 12 or 14 carbon atoms per molecule may be used. This multi-olefin is preferably added to the catalyst solution within a critical range of concentration; the range lying between ½ mol of multi-olefin per mol of Friedel-Crafts catalyst, to 50 or 60 or 100 mols of multi-olefin per mol of Friedel-Crafts catalyst.

This mixture prepared at temperatures below about −50° C. is a stable, unchanging composition which may be used immediately or may be stored before use for a time interval ranging from a few minutes up to several days, approximately two weeks at −78° being probably the limiting permissible storage time; this limit being imposed not by any changes of the multi-olefin or change in relationship between the multi-olefin and the Friedel-Crafts catalyst, but being set by the speed of reaction between the catalyst solvent and the catalyst.

It is not as yet established whether the multi-olefin and Friedel-Crafts catalyst do or do not form a complex or addition compound. The catalyst solution alone is a clear, water-white liquid. The addition of the multi-olefin yields a colored liquid ranging from a light yellow to a more or less deep brown color. The color suggests the possibility of the formation of a complex but to the present no other evidence has been found to prove the existence of a complex, and if a complex is formed, it is a very loose one, quite different from the ordinary complexes with aluminum chloride, where the organic substance and the aluminum chloride are firmly bound together.

The copolymers are desirably prepared from isobutylene, although under some conditions, useful copolymers may be obtained from other isoolefins such as 2 methyl butene-1, 2 methyl pentene-1, 2 methyl hexene-1, 2 methyl heptene-1, and the like. These substances polymerize so much less readily, however, that for most purposes, isobutylene is the preferred isoolefin monomer.

The isobutylene or isobutylene plus 1 to 10 wt. per cent of a multi-olefin is preferably cooled to a temperature below −40° C. This may be accomplished by the use of a refrigerating jacket upon the reactor, any convenient refrigerant being used including such substances as liquid propane, liquid carbon dioxide, liquid ammonia, liquid sulfur dioxide, liquid ethane, liquid ethylene, liquid methane, or even liquid nitrogen under vacuum or pressure as desired, according to the temperature to be obtained. The preferred temperatures are −78° C. as set by liquid or solid $CO_2$, −88° C. as set by liquid ethane, or −103° C., as set by liquid ethylene. Alternatively, the refrigerant may be added directly to the isobutylene, in which case the refrigerants are limited to the carbonaceous refrigerants including liquid propane, liquid or solid carbon dioxide, liquid ethane, liquid ethylene, and occasionally liquid methane. When the isobutylene has been cooled to the desired low temperature, the catalyst-multi-olefin solution is added to the rapidly stirred isobutylene material. A preferred method is by the delivery of the catalyst-multi-olefin solution in the form of fine droplets from a nebulizer onto the surface of the rapidly stirred isobutylene. Alternatively, the catalyst-multi-olefin solution may be delivered into the body of rapidly stirred isobutylene in the form of a fine jet. Rapid dispersion is, however, both desirable and advantageous.

The reaction proceeds with extreme speed, a speed higher than is obtainable by any other known similar reaction procedure; and, in addition, the reaction proceeds rapidly to the complete utilization of the catalyst, and there is a negligible amount of after-polymerization.

The resulting polymer is a linear chain compound having many of the properties of caoutchouc or natural rubber. The molecular weight is found to vary between 6,000 to 10,000 and 125,000, or occasionally higher to 175,000 (as determined by the Staudinger method). The material also shows a substantial iodine number, according to the amount of multi-olefin copolymerized. The preferred range of iodine numbers is from approximately 0.5 to approximately 50; although the most useful iodine numbers lie within the range between about 1 and about 10.

The iodine number is a function of the amount of multi-olefin copolymerized, since the polymerization of the isobutylene destroys from the isobutylene molecules all but one double linkage; and the copolymerization destroys one double linkage from each multi-olefin molecule. A convenient measure of the unsaturation is the so-called "molecular unsaturation." According to this measure, a molecular unsaturation of 100% is obtained by the polymerization of a diolefin, such that one double linkage is retained in the polymer for each molecule of multi-olefin polymerized. Thus, if natural rubber is regarded as a polymer of isoprene, it has a molecular unsaturation of 100%. At the other end of the scale, polyisobutylene has a molecular unsaturation of substantially zero, since it contains no polymerized multi-olefins and the one residual double linkage per molecule is substantially imperceptible. When, however, a copolymer is prepared, a copolymer containing equimolar parts of isobutylene and butadiene, would have a molecular unsaturation of 50%, a copolymer containing 75% isobutylene and 25% butadiene would have a molecular unsaturation of 25%. The preferred polymers according to the present invention contain a molecular unsaturation in the general neighborhood of 1, 2, 3 or 4%, since this is found to be sufficient for a curing reaction and the cured polymer behaves as if all of the double linkages were saturated by the curing.

When polymers of very low unsaturation are to be produced according to the present process, it is satisfactory and convenient to add all of the multi-olefin in and with the catalyst solution. It is, however, entirely satisfactory for any percentage of molecular unsaturation to add a portion of a multi-olefin with the catalyst solution, and a portion with the isobutylene solution; and the latter procedure is preferable when molecular unsaturation values higher than 2 or 3% are desired, since a more uniform polymer is obtainable. Accordingly, the unsaturation of the polymer, whether measured as iodine number or as molecular percent of unsaturation, is determined by the amount of multi-olefin interpolymerized.

The polymer may be recovered from the reaction mixture by separating out the solid polymer in any convenient way. If the reaction is not carried too far, a sufficiently good slurry is obtained to be conveniently strained out from the reaction mixture. Alternatively, the whole reaction mixture may be discharged into warm water to volatilize out any residual refrigerant, catalyst solvent and unreacted components yielding a slurry of solid polymer in water from which it is readily recovered. The polymer is then desirably milled on the double roll mill to drive off moisture and any residual traces of adsorbed hydrocarbon materials.

The resulting polymer is reactive with sulfur and other curing agents such as para quinone dioxide and its analogues and homologues or dinitroso benzene and its analogues and homologues; (with sulfur the reaction is particularly convenient in the presence of a sulfurization aid) to develop in the polymer an elastic limit, a substantial tensile strength, and an excellent elongation at break.

An advantageous compounding recipe is.

RECIPE 1

| | Parts by weight |
|---|---|
| Copolymer | 100 |
| Stearic acid | 1 to 5 |
| Zinc oxide | 1 to 20 |
| Sulfur | 1 to 5 |
| Tetra methyl thiuram disulfide | 1 |

To this recipe there may be added, if desired, from 10 parts to 200 parts of an appropriate carbon black, depending upon the desired characteristics in the cured polymer. This mixture is then cured at temperatures ranging from 275° F. to 350° F. for time intervals ranging from 5 minutes to 120 minutes to yield an excellent substitute for natural rubber (or caoutchouc) which has a tensile strength within the range between 500 pounds and 4500 pounds per square inch; an elongation at break ranging from 500% to 1200%, depending in large part upon the amount of carbon black in the compounding recipe; and a modulus (that is, pounds pull per square inch to stretch the cured material by 300%) ranging from 150 to 1000 pounds, depending in part also upon the amount of carbon black present, and the character of curing agent. It will be obvious that this material is an excellent substitute for caoutchouc in all of its applications; and its property of impermeability of gases which is ten times as high as natural rubber renders it especially suitable for automobile inner tubes, proofed goods, tires, belting, and similar structures.

EXAMPLE 1

A solution of aluminum chloride in methyl chloride was prepared in which 0.0476 gram of aluminum chloride was dissolved per 100 cc. of methyl chloride. To this mixture sufficient isoprene; approximately 0.024 gram per 100 cc. of solution was added to make a solution in methyl chloride of an equi-molecular ratio of aluminum chloride and isoprene. This material was maintained during preparation and use at a temperature of $-78°$ C. by the application of a refrigerating jacket containing solid carbon dioxide to the container. This material was allowed to stand for approximately one hour during which time no polymer precipitated (it is found that if diolefinic polymer does not precipitate within 15 minutes, no polymer will precipitate within many hours or days unless the material is warmed considerably above the $-78°$ C). Simultaneously, a portion of isobutylene in methyl cloride in the proportion of 10 parts by volume of isobutylene to 30 parts by volume of methyl chloride, sufficient of the solution being prepared to contain 10 grams of isobutylene. This solution was stirred vigorously at $-78°$ C. and the catalyst-isoprene solution, was added drop by drop, to the rapidly stirred isobutylene solution.

As soon as the catalyst treatment began by the addition of a few drops of catalyst, the reaction occurred with very great vigor and continued with great vigor during the addition of the catalyst-isoprene solution, the reaction being substantially complete when the last of the catalyst-isoprene solution had been added. It may be noted that the polymerization reaction is strongly exothermic and that great difficulty was had in maintaining the reaction temperature at $-78°$ C., and during much of the time by addition of catalyst-isoprene solution, the temperature was close to the boiling point of methyl chloride at $-23°$ C.

When the last of the catalyst-isoprene solution had been added, the solid polymer was recovered by dropping the reaction mixture into warm water. The weight of the solid polymer recovered was approximately 90% of the weight of the isobutylene and isoprene originally used. The material was found to have an iodine number of 2.9, indicating a molecular unsaturation of approximately 0.64 mol percent; and a molecular weight, or Staudinger number, of approximately 28,000. (It may be noted that the iodine number is equivalent to the mol unsaturation multiplied by the constant of 4.54.)

This material was compounded according to Recipe 1 above set forth and was found to have an adequate tensile strength, an excellent elongation and a reasonably satisfactory modulus.

EXAMPLE 2

A series of polymerizations were run, closely similar to those in Example 1, using a variety of diolefins, a variety of mol ratios of diolefin to catalyst and a variety of catalysts but with substantially the same procedural steps in each polymerization. The procedural steps and the various values are shown in the subjoined Table I in which the successive polymers are numbered from 1 to 24; the diolefin used is indicated by name, and the catalyst used is indicated by name. In each polymerization, methyl chloride was used as the catalyst solvent; and the concentration of catalyst also is shown in the table for each polymerization. Similarly, the molecular ratio of diolefinic substance to catalyst is shown. The next to last and last columns in Table I show the mol unsaturation in percent; and the molecular weight; or better, the Staudinger number.

TABLE I

*Complex catalyst of Friedel-Crafts reagents and diolefins*

| Run No. | Diolefin | Catalyst | Catalyst Concentration g./100 cc. CH$_3$Cl | Diolefin/Catalyst Mol Ratio | Unsaturation Mol Per Cent | Mol. Wt. Staudinger |
|---|---|---|---|---|---|---|
| 1 | Isoprene | AlCl$_3$ | 0.0476 | 1 | 0.64 | 28,000 |
| 2 | do | do | .0476 | 5 | .25 | 29,000 |
| 3 | do | do | .0476 | 10 | .33 | 16,000 |
| 4 | do | do | .088 | 3 | .96 | 15,000 |
| 5 | Butadiene | do | .15 | 30 | .38 | 34,000 |
| 6 | do | do | .15 | 110 | .93 | 24,000 |
| 7 | do | do | .15 | 107 | .86 | 31,000 |
| 8 | Dimethyl Butadiene | do | .15 | 18 | 1.45 | 27,000 |
| 9 | Butadiene | TiCl$_4$ | .28 | 17 | .28 | 22,000 |
| 10 | do | do | .28 | 33 | .32 | 21,000 |
| 11 | do | do | .28 | 82 | .80 | 16,000 |
| 12 | Isoprene | do | .14 | 28 | .65 | 18,000 |
| 13 | do | do | .14 | 68 | 2.66 | 14,000 |
| 14 | Myrcene | do | .14 | 32 | 2.43 | 10,000 |
| 15 | Piperylene | do | .28 | 27 | 1.13 | 20,000 |
| 16 | Butadiene | BF$_3$ | .15 | 9 | 1.47 | 5,000 |
| 17 | do | do | .15 | 18 | .87 | 10,000 |
| 18 | do | do | .075 | 36 | .73 | 31,000 |
| 19 | do | do | .15 | 45 | 1.29 | 14,000 |
| 20 | do | do | .15 | 90 | 1.36 | 45,000 |
| 21 | do | do | .075 | 90 | .80 | 30,000 |
| 22 | Isoprene | do | .15 | 15 | .91 | 6,000 |
| 23 | Isoprene ($-102°$) | do | .076 | 30 | 1.47 | 12,000 |
| 24 | do | do | .030 | 75 | 1.50 | 12,000 |

Reaction $-78°$ C. unless noted, charge 50 cc. iso C$_4$H$_8$; 150 cc. CH$_3$Cl.

It may be noted that in each instance but the last two the polymerization was conducted at $-78°$ C.; the catalyst solution of aluminum chloride in methyl chloride being prepared at $-23°$ C.; then the solution cooled to −78° C. and the desired amount of the indicated diolefin added to the catalyst solution. In each instance the mixed solution of catalyst and diolefin was allowed to stand at least 15 minutes to make sure that no polymerization of the diolefin would occur. The cold catalyst-diolefin solution was then added to the isobutylene solution, which in each instance consisted of 50 cc. of isobutylene in solution in 150 cc. of methyl chloride cooled to −78° C. In each instance also the catalyst-diolefin solution was added drop by drop to the rapidly-stirred isobutylene solution as in Example 1, and the reaction proceeded in substantially the same manner.

It may be noted also that in Table I, polymers No. 23 and 24 were conducted with liquid ethylene in the refrigerating jacket at a temperature of approximately −102° to −103° C.

Since the molecular weight and mol unsaturation are excellent indices of the curability of these copolymers, only a few of these polymers were compounded, cured and the physical properties verified. In each instance, however, the physical properties were closely the same as the physical properties of prior polymers having similar molecular weights and mol unsaturations. That is, molecular weight above about 20,000 cured to a solid elastic material of more or less high tensile strength; materials having molecular weights between 20,000 and 15,000 cured, but to materials of relatively poor tensile strength, and materials having molecular weights below 15,000 did not cure.

EXAMPLE 3

A similar series of polymerizations were conducted at temperatures of −102° to −103° C. using butadiene in solution with aluminum chloride in methyl chloride. These butadiene-catalyst solutions were preparred as in Examples 1 and 2: the aluminum chloride being dissolved first in the methyl chloride at temperatures in the neighborhood of −23° C., then cooled to −78° C. by solid carbon dioxide and the butadiene added. The isobutylene was prepared in admixture with methyl chloride, as shown under the heading of "Feeds" in Table II and was cooled by a refrigerating jacket containing liquid ethylene to a temperature between −102° and −103° C.; then the aluminum chloride-butadiene solution added, as before, dropwise to the rapidly-stirred isobutylene. The polymerization proceeded rapidly, substantially in the same manner as in Examples 1 and 2. The materials used and the results are shown in Table II.

It may be noted that while the molecular weights of these polymers are extremely high, the mol percent unsaturation is, in various of the instances, relatively low.

TABLE II

*Polymerization of isobutylene at −102° by $C_4H_6/AlCl_3$ complex catalysts*

| Run Number | Final Catalyst Soln. | | Feed | Conversion, percent | Catalyst Efficiency g. polymer/g. AlCl₃ | Unsat. Mol percent | Mol. Wt. | |
|---|---|---|---|---|---|---|---|---|
| | g. AlCl₃/100 cc. | C₄H₆/AlCl₃ mol ratio | | | | | Staudinger | Viscosity Average |
| 1 | 0.08 | 35 | 3:1 | 89 | 1,050 | .37 | 160,000 | 3,380,000 |
| 2 | 0.08 | 35 | 3:1 | 49 | 900 | .27 | 162,000 | 3,400,000 |
| 3 | 0.08 | 35 | 3:1 A-10 | 58 | 720 | .55 | 94,000 | 1,470,000 |
| 4 | 0.08 | 50 | 3:1 | 91 | 900 | .28 | 145,000 | 2,900,000 |
| 5 | 0.08 | 50 | 3:1 | 53 | 940 | 1.11 | 150,000 | 3,000,000 |
| 6 | 0.08 | 50 | 3:1 A-10 | 76 | 630 | .71 | 70,000 | 910,000 |
| 7 | 0.08 | 65 | 3:1 | 75 | 1,190 | .18 | 141,000 | 2,800,000 |
| 8 | 0.08 | 65 | 3:1 | 21 | 460 | .36 | 170,000 | 3,700,000 |
| 9 | 0.08 | 65 | 3:1 A-10 | 76 | 730 | .63 | 77,000 | 1,080,000 |
| 10 | 0.18 | 29 | 3:1 B-8 | 65 | 350 | 4.62 | 31,000 | 250,000 |

(The last column shows the molecular weight as defined by Flory in the Journal Am. Chem. Soc. 65, 380 (1943)).

| Feeds | Isobutylene | Butadiene | Isoprene | Methyl Chloride |
|---|---|---|---|---|
| | Cc. | Cc. | Cc. | Cc. |
| 3:1 | 350 | | | 1,050 |
| 3:1 A-10 | 350 | 30 | | 1,050 |
| 3:1 B-8 | 350 | | 27 | 1,050 |

It was observed that the aluminum chloride-butadiene catalyst solution was much more stable, stable with a higher percentage of aluminum chloride and stable at higher temperatures than most of the analogous solutions containing other diolefins; indicating the much lower polymerizability of butadiene. This is in line with past experience with butadiene. The consequence, however, of these characteristics is that a relatively high molecular weight is obtained and a relatively low mol percent unsaturation is obtained, both of which are not suitable for best physical properties in the cured material. Accordingly, a limited number only of the polymers were compounded and cured. Polymers Nos. 3, 6, 9 and 10 only were compounded and cured, the results obtained being shown in Table III.

TABLE III

*Pure gum cures*

| Run No. | Minutes at 307° F. Tensile—300% Modulus—Elongation | | | |
|---|---|---|---|---|
| | 20′ | 40′ | 60′ | 120′ |
| 3 | | | 200− 30−1150 | 100− 30−900 |
| 6 | 100− 30− 110 | 600− 70−1100 | 600− 100−1050 | 400− 80− 950 |
| 9 | 200− 50−1150 | 400− 80−1000 | 500− 80− 950 | 600− 80−950 |
| 10 | 500−340− 400 Tread Stock 3200−690− 800 | 400−390− 300 3000−940− 650 | 400− 420− 330 3100−1060− 600 | 400− 340−350 3000−1060−600 |

Polymer No. 10 was given two different evaluations, one with only 10 parts carbon black, the other with a tread stock recipe containing 50 parts of carbon black.

|  | Tread Stock 50 Parts Carbon Black | Pure Gum Stock 10 Parts Carbon Black |
|---|---|---|
| Polymer | 100 | 100 |
| Zinc Oxide | 5 | 5 |
| Stearic Acid | 3 | 3 |
| Sulfur | 2 | 1.5 |
| Tetramethyl thiuram disulfide | 1. | 1. |
| Mercaptobenzothiazole | .5 | ---- |
| Carbon Black | 50 | 10 |

These results, particularly No. 10, further show the excellent quality of polymers obtained.

ing isobutylene at $-102°$ to $-103°$ C. for interpolymerization with isoprene in solution with aluminum chloride in methyl chloride solvent. The polymerizations were conducted in the same way as described in the previous examples, and the results are given in Table IV.

These results show moderately high molecular weight values and moderately high mol percent unsaturation. In the preceding examples some only of the polymers were compounded, cured and evaluated. Two compounding recipes were used as shown in Example 3.

As indicated in Table V the compounded polymers were cured for 20, 40, 60 and 120 minutes and evaluations were made on the cured specimens to yield the inspection results shown in Table V. It will be noted from these results that

TABLE IV

*Polymerization of isobutylene at $-102°$ by $C_5H_8/AlCl_3$ complex catalyst*

| Run Number | g. $AlCl_3$/100 cc. | $C_5H_8/AlCl_3$ Mol Ratio | Feed | Conversion, Per Cent | Catalyst Efficiency g. polymer/g. $AlCl_3$ | Unsat. Mol Per Cent | Mol. Wt.$\times 10^{-3}$ Staudinger | Viscosity Average |
|---|---|---|---|---|---|---|---|---|
| 1 | 0.10 | 10 | 3:1 | 16 | 450 | 0.24 | 160 | 3,400 |
| 2 | 0.10 | 10 | 3:1 | 19 | 1,000 | 0.17 | 173 | 3,800 |
| 3 | 0.08 | 10 | 3:1 | 51 | 730 | 0.46 | 107 | 1,800 |
| 4 | 0.10 | 10 | 3:1 | 60 | 1,930 | 0.21 | 145 | 2,900 |
| 5 | 0.08 | 10 | 3:1 | 74 | 610 | 0.42 | 95 | 1,450 |
| 6 | 0.08 | 17.5 | 3:1 | 28 | 530 | 0.76 | 111 | 1,900 |
| 7 | 0.08 | 17.5 | 3:1 | 61 | ---- | 0.53 | 120 | 2,100 |
| 8 | 0.08 | 17.5 | 3:1 | 64 | 470 | 0.67 | 101 | 1,600 |
| 9 | 0.10 | 20 | 3:1 | 28 | 1,270 | 0.42 | 190 | 4,350 |
| 10 | 0.10 | 20 | 3:1 | 31 | 1,050 | 0.24 | 160 | 3,400 |
| 11 | 0.10 | 20 | 3:1 | 65 | 1,570 | 0.62 | 131 | 2,430 |
| 12 | 0.10 | 30 | 3:1 | 18 | 520 | 0.39 | 150 | 3,050 |
| 13 | 0.10 | 30 | 3:1 | 32 | 260 | 0.53 | 145 | 2,900 |
| 14 | 0.10 | 30 | 3:1 | 35 | 320 | 0.66 | 125 | 2,300 |
| 15 | 0.10 | 30 | 3:1 | 50 | 980 | 0.42 | 144 | 2,900 |
| 16 | 0.10 | 30 | 3:1 | 54 | 460 | 0.69 | 108 | 1,850 |
| 17 | 0.08 | 30 | 3:1 | 87 | 490 | 1.15 | 90 | 1,360 |
| 18 | 0.08 | 30 | 2:1 | 53 | 1,170 | 0.56 | 122 | 2,200 |
| 19 | 0.08 | 30 | 4:1 | 66 | 840 | 0.95 | 69 | 900 |
| 20 | 0.10 | 40 | 3:1 | 46 | 800 | 0.66 | 114 | 1,960 |
| 21 | 0.10 | 40 | 3:1 | 86 | 910 | 1.05 | 78 | 1,070 |
| 22 | 0.08 | 50 | 3:1 | 30 | 190 | 1.78 | 46 | 470 |
| 23 | 0.08 | 50 | 3:1 | 52 | 260 | 2.28 | 34 | 300 |
| 24 | 0.08 | 50 | 3:1 | 76 | 220 | 2.68 | 46 | 470 |

| Feed | $CH_3Cl$ | $i$-$C_4H_8$ |
|---|---|---|
|  | Cc. | Cc. |
| 3:1 | 1,050 | 350 |
| 2:1 | 933 | 467 |
| 4:1 | 1,120 | 280 |

All cures at 307° F.

EXAMPLE 4

A similar polymerization was conducted utilizing by suitable choice of polymerization conditions, excellent grades of polymers are obtainable.

TABLE V

| Run Number | Tread Stock (Tensile—300% Modulus—Elongation) | | | | Pure Gum Stock (Tensile—300% Modulus—Elongation) | | | |
|---|---|---|---|---|---|---|---|---|
|  | 20' | 40' | 60' | 120' | 20' | 40' | 60' | 120' |
| 1 |  |  |  |  |  |  |  |  |
| 2 |  |  |  |  | 300— 70—1250 | 1100— 90—1200 | 1200— 90—1200 | 400— 40— 130 / 1100—120—1100 |
| 3 |  |  |  |  |  | 300— 40—1400 | 1300— 50—1300 | 600— 60—1000 |
| 4 | 1000—120—1050 | 1800—240—1050 | 1800—230—1100 | 1600— 300— 800 | 1100— 90—1100 | 1800—130—1050 | 2300—130—1000 | 2400—140—1050 |
| 5 |  |  |  |  |  |  |  |  |
| 6 |  |  |  |  | 1300— 60—1300 | 100 — 70—1300 | 1100— 70—1200 | 1000— 80—1100 |
| 7 |  |  |  |  | 500— 90—1250 | 120.— 90—1200 | 1700—110—1150 | 1700—120—1100 |
| 8 | 1100—140—1100 | 1900—190—1000 | 2200— 250—1050 | 2400— 270— 950 | 1000—120—1100 | 2200—140—1100 | [1] 2900—140— 950 | 2700—140— 950 |
| 9 |  |  |  |  | 900— 80—1050 | 1500— 90—1000 | 1600— 90—1000 | 1600—100—1000 |
| 10 |  |  |  |  |  | 200— 40—1150 | 300— 40—1200 | 300— 60—1100 |
| 11 |  |  |  | 1000— 120—1150 |  | 300— 50—1000 | 500— 50—1050 |  |
| 12 |  |  |  | 400— 120—1000 |  | 400— 40—1050 | 400— 40— 950 | 400— 40— 950 |
| 13 |  |  |  |  |  |  |  |  |
| 14 |  | 1400—170— 850 | 2100— 200— 950 | 1400— 230— 750 | 1000— 70—1100 | 1200— 80— 950 | 1400— 90—1000 | 1400— 80— 950 |
| 15 |  |  |  | 600— 100—1100 | 800— 70—1000 | 1400— 80—1000 | 800— 80—1000 | 1300— 80— 900 |
| 16 |  | 1200—140—1100 | 1300— 130—1050 | 1600— 180— 950 | 1000— 70—1050 | 1400— 70—1050 | 1600— 90—1000 | 1900—120— 950 |
| 17 | 2000—240— 950 | 2400—330— 850 | 2900— 440— 850 | 3200— 550— 750 | 1900—130—1100 | 250—140— 950 | 2600—170— 950 | 2600—150— 850 |
| 18 |  |  |  | 1090— 190— 800 | 700— 70—1100 | 1200— 80—1100 | 1900— 90—1050 | 2100—120—1000 |
| 19 | 1900—220— 950 | 2800—260— 950 | 3100— 290—1000 | 3200— 350— 800 | [1] 2200—140—1000 | [1] 1900—150— 900 | [1] 2300—150— 850 | [1] 3000—190— 900 |
| 20 | 400—130— 800 | 800—170— 800 |  | 1300— 260— 750 | 2700— 70—1000 | 2800— 80—1000 | 3400— 80— 800 | 3200— 80— 800 |
| 21 | 1600—200—1050 | 1800—230— 950 | 2400— 320— 900 | 2500— 400— 850 |  | 300— 30—1150 | 400— 40—1300 | 900— 60—1250 |
| 22 | 2400—430— 850 | 2600—540— 750 | 2900— 690— 700 | 2800— 790— 650 | [1] 2400—150—1000 | 2900—200— 900 | 1800—220— 700 | 2500—200— 700 |
| 23 |  | 2700—840— 650 | 2600— 950— 650 | 2600—1100— 550 | 2100—140— 900 | 2000—220— 800 | 2000—220— 700 | 1100—230— 600 |
| 24 |  | 2800—970— 650 | 2700—1100— 600 | 2700—1180— 550 | 2500—190— 900 | 2000—200— 750 | 1100—220— 600 | 900—230— 500 |

[1] Jaw break. All cures at 307° F.

TABLE VI

| Run No. | Final AlCl₃ Concn., g./100 cc. | C₅H₈/AlCl₃ Mol Ratio | Conv. Per Cent | Catalyst Efficiency g. Polymer g. AlCl₃ | Unsat. Mol. Per cent | Mol. Wt.×10⁻³ Staudinger | Mol. Wt.×10⁻³ Viscosity | Mooney Viscosity |
|---|---|---|---|---|---|---|---|---|
| | | | | | | | | B-3 Feed |
| 1 | 0.08 | 1.5 | 50 | 480 | 1.57 | 56 | 650 | 90 |
| 2 | 0.08 | 17 | 16 | 490 | .98 | 54 | 610 | --- |
| 3 | 0.08 | 17 | 21 | 440 | 1.21 | 48 | 510 | --- |
| 4 | 0.08 | 17 | 37 | 430 | 1.46 | 49 | 540 | --- |
| 5 | 0.08 | 17 | 50 | 390 | 1.51 | 53 | 600 | 82 |
| 6 | 0.08 | 17 | 53 | 360 | 1.54 | 47 | 500 | 91 |
| 7 | 0.08 | 17 | 57 | 540 | 1.60 | 51 | 560 | 93 |
| 8 | 0.08 | 17 | 76 | 380 | 1.79 | 46 | 470 | 84 |
| 9 | 0.08 | 50 | 31 | 370 | 2.16 | 41 | 400 | --- |
| 10 | 0.08 | 50 | 50 | 190 | 3.03 | 31 | 260 | 54 |
| 11 | 0.08 | 50 | 51 | 340 | 2.22 | 43 | 430 | 87 |
| 12 | 0.08 | 50 | 60 | 290 | 2.64 | 34 | 300 | 66 |
| | | C₄H₆/AlCl₃ | | | | | | B-8 Feed |
| 13 | .18 | 29 | 53 | 250 | 3.36 | 31 | 260 | 41 |
| 14 | .18 | 29 | 65 | 350 | 4.62 | 31 | 250 | --- |
| 15 | .18 | 29 | 80 | 230 | 4.08 | 30 | 250 | 33 |
| 16 | .18 | 29 | 80 | 220 | 4.35 | 36 | 330 | 33 |

Feed recipe

| Feed | B-3 | B-8 |
|---|---|---|
| | Parts | Parts |
| Isobutylene | 350 | 350 |
| Isoprene | 10 | |
| Butadiene | | 27 |
| Methyl Chloride | 1,050 | 1,050 |

The resulting polymers were cured according to the recipes indicated in Example 3, one using 50 parts of carbon black per 100 parts of polymer; the other using 10 parts of carbon black per 100 parts of polymer.

Portions of the respective compounds were then cured for 20, 40, 60 and 120 minutes and thereafter evaluated for tensile strength, modulus and elongation at break to yield the results shown in Table VII.

catalysts in the polymerization of feeds containing isobutylene and styrene illustrate another difference in the behavior of the diolefin complex catalysts. A feed containing the following:

120 parts styrene
80 parts isobutylene
850 parts methyl chloride was polymerized at −102° C. with a catalyst solution comprising 0.15% aluminum chloride in methyl chloride and sufficient butadiene to give a butadiene-aluminum chloride mol ratio of 14. During this polymerization only a slight yellow color developed in the feed; whereas with an aluminum chloride catalyst solution, this feed becomes a very dark reddish brown in color. The product of this polymerization appeared to have a higher softening temperature than the product obtained with aluminum chloride catalyst.

TABLE VII

| Run No. | Tensile, 300% Modulus, Elongation—50 Pts. Carbon Black, Minutes at 307° F. | | | | Tensile, 300% Modulus, Elongation—10 Pts. Carbon Black, Minutes at 307° F. | | | |
|---|---|---|---|---|---|---|---|---|
| | 20' | 40' | 60' | 120' | 10' | 20' | 40' | 60' |
| 1 | 3600—440— 950 | 3500— 460—900 | 3500— 580—800 | 3700— 730—750 | 2900—170—1100 | 3900—310— 900 | 4100—360—800 | 4000—400—800 |
| 2 | 3400—510— 950 | 3700— 430—900 | 3500— 530—800 | 3700— 570—750 | 800—250—1100 | 3200—360—1000 | 4300—490—900 | 3000—330—750 |
| 3 | 3500—440—1050 | 3700— 500—850 | 3700— 590—800 | 3700— 650—800 | 1200—140—1200 | 3300—270—1050 | 4200—360—900 | 4200—340—850 |
| 4 | 3800—450— 950 | 3700— 540—800 | 3700— 600—750 | 3700— 710—700 | 1200—120—1050 | 2200—190— 900 | 2500—220—850 | 3100—280—800 |
| 5 | 3400—400— 950 | 3400— 480—800 | 3500— 670—750 | 3600— 720—750 | 1200—160—1050 | 2400—210— 900 | 2800—390—750 | 3900—470—750 |
| 6 | 3400—590—1000 | 3800— 500—850 | 3400— 630—750 | 3700— 590—750 | 1900—280—1000 | 2600—370— 900 | 2900—420—700 | 3700—370—750 |
| 7 | 3700—440— 900 | 3600— 560—800 | 3600— 560—800 | 3700— 730—750 | 2400—180—1100 | 3500—320— 900 | 4100—340—800 | 4200—380—800 |
| 8 | 3600—470— 900 | 3500— 550—850 | 3500— 640—800 | 3700— 770—750 | 1800—170—1050 | 3000—200—1050 | 2300—240—800 | 2400—300—650 |
| 9 | 3400—480— 850 | 3400— 590—800 | 3400— 730—700 | 3500— 830—700 | 2600—200—1100 | 3200—250— 850 | 1300—310—600 | 3000—380—800 |
| 10 | 3200—520— 900 | 3300— 740—800 | 3400— 940—700 | 3300—1000—650 | 2600—240—1100 | 3100—280— 900 | 3300—270—900 | 900—340—500 |
| 11 | 3400—540— 900 | 3600— 720—800 | 3400— 800—750 | 3200— 840—650 | 3600—230— 1000 | 2700—220—1000 | 2600—310—750 | 2400—350—700 |
| 12 | 3300—520— 850 | 3300— 680—750 | 3500— 830—700 | 3300— 730—650 | 2900—200—1100 | 3100—250— 800 | 1100—270—550 | 1700—360—600 |
| 13 | 3200—730— 750 | 2900—1110—550 | 2800—1240—500 | 2800—1480—500 | 2000—270— 750 | 2000—300— 750 | 900—370—450 | 800—400—400 |
| 14 | 3200—690— 800 | 3000— 940—650 | 3100—1060—600 | 3000—1060—600 | | 400—340— 300 | 400—420—350 | 400—420—350 |
| 15 | 2900—860— 650 | 2800—1430—500 | 2600—1650—400 | 2300—1790—350 | 1600—310— 700 | 1300—280— 600 | 1000—490—400 | 800—560—400 |
| 16 | 2900—810— 750 | 2900—1200—550 | 2500—1460—450 | 2500—1680—400 | 1700—350— 650 | 1400—300— 600 | 1000—390—450 | 900—430—450 |

These results show the excellent quality of polymer obtained. It may be noted that when using this procedure in a continuous reactor, with a continuous delivery of feed and catalyst to a jacketed reactor with continuous overflow, substantially all of the polymerization occurs within a relatively short distance from the point of introduction of the catalyst solution, again showing the extreme speed of reaction. Tests for low ends on this polymer show a much narrower distribution of molecular weight values in the various polymer molecules than is obtainable by any other procedure.

EXAMPLE 5

The behavior of the multi-olefin Friedel-Crafts

Improved products (tougher—indicating a higher molecular weight) were also obtained in the polymerization of feeds of the type 120 parts styrene
80 parts isobutylene
6 parts isoprene
850 parts methyl chloride with a methyl chloride solution containing 0.07% aluminum chloride and isoprene-aluminum chloride mol ratios in the range of 1 to 40.

EXAMPLE 6

It has been pointed out above that the catalyst solution prepared with the Friedal-Crafts catalyst and the multi-olefin is stable indefinitely if kept below a critical temperature; and that in some instances an improved polymer is obtained by aging the catalyst. This is not, however, necessary and the catalyst may be used with as much or as little storage as desired, since, without regard to the storage time, it is particularly advantageous for the production of a more uniform polymer and this improved uniformity of polymer can be obtained by spraying or pressure-injection processes which cannot be obtained with prior processes.

For this purpose the aluminum chloride solution may be prepared and stored at whatever temperature is convenient, which, with methyl chloride, is usually around −23° C., or with ethyl chloride is usually around +12° C. The diolefin may then be stored at room temperature and the two cooled, diluted and mixed, as desired, immediately before use. When this sequence of steps is outlined, no question of induction period or stability or premature precipitation of an olefinic polymer in spray heads or nozzles arises, yet, at the same time, the advantages in the way of increased speed of reaction and increased uniformity of polymer are obtained. It may be noted, however, that the conditions of temperature and concentration must hold from the moment of preparation of the catalyst-multi-olefin solution to the polymerization.

A series of polymerizations were made in which a portion of the multi-olefin was introduced with the catalyst solution and another portion was introduced with the isobutylene in a continuous process. In these runs, varying mol percentages of isoprene as the multi-olefin with respect to the aluminum chlorides were used as shown in Table VI. In this instance the feeds were prepared as shown in the recipe at the bottom of Table VI and the catalyst was prepared by delivering a continuous measured stream of aluminum chloride solution in methyl chloride mixed at a temperature of approximately −78° C. with sufficient additional methyl chloride to bring the final catalyst concentration to the value indicated and with sufficient isoprene to give the mol ratio indicated, all three streams being cooled to −78° C., metered and admixed with measured amounts of isobutylene feed, as indicated.

Table VI shows 12 polymerization runs, using aluminum chloride catalyst solution containing 0.08% of aluminum chloride, and from 1.5 to 50 mols of isoprene per mol of aluminum chloride. Four additional polymerization runs were made using butadiene in a mol ratio of 29 and an aluminum chloride catalyst concentration of 0.18%.

Thus the present invention prepares a mixed catalyst-multi-olefin solution which is stable for relatively prolonged time intervals; which is available for the copolymerization of the multi-olefin in the mixed solution with an isoolefin such as isobutylene to yield a highly valuable copolymer.

While there are above disclosed but a limited number of embodiments of the process and product of the invention, it is possible to produce still other embodiments without departing from the inventive concept herein disclosed and defined in the appended claims.

The invention claimed is:

1. A low temperature polymerization catalyst comprising a solution of aluminum chloride in an alkyl chloride of 1 to 2 carbon atoms in a concentration between 0.1% and 0.01% together with a diolefin having 4 to 6 carbon atoms per molecule in the proportion from 0.5 mol to 100 mols per mol of dissolved aluminum chloride.

2. A low temperature polymerization catalyst comprising a stable solution of aluminum chloride in methyl chloride in a concentration between 0.1% and 0.01% together with isoprene in the proportion between ½ mol and 60 mols per mol of dissolved aluminum chloride.

3. A low temperature polymerization catalyst comprising a stable solution of aluminum chloride in methyl chloride in a concentration between 0.1% and 0.01% together with butadiene in the proportion between ½ mol and 100 mols per mol of dissolved aluminum chloride.

4. A low temperature polymerization catalyst comprising a stable solution of aluminum chloride in methyl chloride in a concentration between 0.1% and 0.01% together with dimethyl butadiene in the proportion between ½ mol and 100 mols per mol of dissolved aluminum chloride.

5. The polymerization process comprising the steps in combination of dissolving aluminum chloride in an alkyl chloride of 1 to 2 carbon atoms in a concentration between 0.1 and 0.01%, cooling the solution to a temperature below about −50° C., adding thereto for each mol of dissolved catalyst between 0.5 to 60 mols of a diolefin having 4 to 6 carbon atoms and thereby forming a stable, non-polymerizing solution; thereafter cooling a substantial quantity of a polymerizable isobutylene feed to a temperature within the range between −40° C. and −164° C. and adding to it the cold catalyst diolefin mixture.

6. The polymerization process comprising the steps in combination of dissolving aluminum chloride in an alkyl chloride of 1 to 2 carbon atoms in a concentration between 0.1 and 0.01%, cooling the solution to a temperature below about −50° C., adding thereto for each mol of dissolved catalyst between 0.5 to 60 mols of a diolefin having 4 to 6 carbon atoms and thereby forming a stable, non-polymerizing solution; thereafter cooling a substantial quantity of isobutylene in admixture with a styrene to a temperature within the range between −40° C. and −164° C. and adding to it the cold catalyst diolefin mixture.

7. The polymerization process comprising the steps in combination of dissolving aluminum chloride in an alkyl chloride of 1 to 2 carbon atoms in a concentration between 0.1 and 0.01%, cooling the solution to a temperature below about −50° C., adding thereto for each mol of dissolved catalyst between 0.5 to 60 mols of a diolefin having 4 to 6 carbon atoms and thereby forming a stable, non-polymerizing solution; thereafter cooling a substantial quantity of isobutylene in admixture with styrene and a diolefin having 4 to 6 carbon atoms per molecule to a temperature within the range between −40° C. and −164° C. and adding to it the cold catalyst diolefin mixture.

8. A process according to claim 5 wherein the diolefin is butadiene.

9. The polymerization process which comprises the steps of dissolving aluminum chloride in an alkyl chloride of 1 to 2 carbon atoms in a concentration between 0.05 and 0.1%, cooling the solution to a temperature between −23° C. and −100° C., adding thereto between 0.5 and 60 mols of isoprene per mol of dissolved aluminum chloride and thereby forming a stable non-polymerizing catalyst solution; thereafter cooling isobutylene to a temperature between −40° C. and −164° C. and adding the said catalyst solution to the isobutylene in finely dispersed condition.

10. The polymerization process which comprise the steps of dissolving aluminum chloride in methyl chloride in a concentration between 0.1 and 0.01%, cooling the solution to a temperature between about −50° C. and −100° C., adding thereto between 0.5 and 60 mols of isoprene per mol of dissolved aluminum chloride and thereby forming a stable catalyst solution; thereafter cooling a feed mixture comprising isobutylene admixed with 1 to 10 weight percent of isoprene to a temperature between −40° C. and −164° C. and adding the said catalyst solution to the feed mixture.

11. A process according to claim 5 wherein the polymerizable feed contains isobutylene in admixture with a diolefin having 4 to 6 carbon atoms per molecule.

RALPH W. DORNTE.
JOHN F. McKAY, Jr.

REFERENCES CITED

The following references are of record in the file of this patent:

UNITED STATES PATENTS

| Number | Name | Date |
|---|---|---|
| 2,269,421 | Arveson | Jan. 13, 1942 |
| 2,273,158 | Thomas | Feb. 17, 1942 |
| 2,370,195 | Ross | Feb. 27, 1945 |
| 2,382,586 | Solomon | Aug. 14, 1945 |
| 2,434,552 | Elmore | Jan. 13, 1948 |